United States Patent [19]
Steinberg

[11] Patent Number: 4,673,260
[45] Date of Patent: Jun. 16, 1987

[54] STEREOSCOPIC OPTICAL DEVICE

[75] Inventor: Itzchak Z. Steinberg, Rehovot, Israel

[73] Assignee: Yeda Research & Development Co., Ltd., Rehovot, Israel

[21] Appl. No.: 657,878

[22] Filed: Oct. 4, 1984

[30] Foreign Application Priority Data

Oct. 16, 1983 [IL] Israel .................................. 69975

[51] Int. Cl.$^4$ ...................... G02B 21/22; G02B 7/06
[52] U.S. Cl. .................................. 350/516; 350/556
[58] Field of Search .................. 350/515-519, 350/557-558, 571, 130-131, 139, 142, 145-146, 55-556, 1; 356/12-14

[56] References Cited

U.S. PATENT DOCUMENTS

| | | | |
|---|---|---|---|
| 1,637,563 | 8/1927 | Gary | 350/515 |
| 1,914,212 | 6/1933 | Ott | 350/515 |
| 2,087,329 | 7/1937 | Ott | 350/515 |
| 2,826,114 | 3/1958 | Bryan | 350/145 |
| 3,029,696 | 4/1962 | Schmidt | 350/549 |
| 3,353,892 | 11/1967 | Minns et al. | 350/519 |
| 4,264,122 | 4/1981 | Schmidt et al. | 350/551 |
| 4,395,731 | 7/1983 | Schoolman | 350/518 |
| 4,448,498 | 5/1984 | Muller et al. | 350/518 |

FOREIGN PATENT DOCUMENTS

| | | | |
|---|---|---|---|
| 342230 | 9/1904 | France | 356/12 |
| 135170 | 4/1952 | Sweden | 356/12 |
| 511571 | 7/1976 | U.S.S.R. | 356/1 |

OTHER PUBLICATIONS

Fry, G. A., "Visual Perception in Space", American Jr. of Optometry & Arch. of American Acad. of Optometry, 11-1950, pp. 531-553.

Dewhurst, H., "Auto-Precision Stereoscopy", The Photographic Jr., vol. 92B, 1952, pp. 2-24.

Menz, J., "Three Dimensional Surface Measuring with the Jena-Made SMXX Stereomicroscope", Jena Review, #4, 1969, pp. 238-241.

Primary Examiner—William H. Punter
Attorney, Agent, or Firm—Browdy and Neimark

[57] ABSTRACT

Stereoscopic binocular apparatus comprising first and second optical axes and means for arranging the first and second optical axes in the plane defined thereby whereby they converge at the location of the object being viewed.

4 Claims, 3 Drawing Figures

STEREOSCOPIC OPTICAL DEVICE

FIELD OF THE INVENTION

The present invention relates to stereoscopic optical apparatus generally and more particularly to magnifying optical apparatus such as binoculars and stereomicroscopes.

BACKGROUND OF THE INVENTION

Binoculars and stereomicroscopes have been known and used for many hundreds of years. In the design of binoculars, particular care is taken to ensure that the two optic axes of the individual telescopes are parallel to each other. There are known in the patent literature, however, stereomicroscopes which permit the distance between the eyepieces to be adjusted to accomodate different pupillary distances of different users. Examples of such stereomicroscopes are found in U.S. Pat. Nos. 1,914,212 (Ott), 1,637,563 (Gary) and 2,087,329 (Ott). There are also known stereomicroscopes which employ converging light paths, such as microscopes of the Greenough type in which the angle between the microscope tubes may be adjustable.

It may be perceived by users of binoculars and microscopes that magnification produces distortion of depth perception of the object. Thus an object seen through binoculars appears flattened. Objects seen through stereomicroscopes may also seem distorted; i.e. they may have either exaggerated or flattened depth appearance. Applicant is not aware of any proposed solution of this problem.

SUMMARY OF THE INVENTION

The present invention seeks to provide a solution to the problem of depth distortion produced by stereoscopic optical apparatus such as binoculars and microscopes.

There is thus provided in accordance with a preferred embodiment of the present invention stereoscopic binocular apparatus comprising first and second optical axes and means for arranging the first and second optical axes in the plane defined thereby whereby they converge at the location of the object being viewed.

Further in accordance with a preferred embodiment of the present invention, there is provided stereoscopic binocular apparatus defining first and second optical axes whose relative angular orientation in the plane defined thereby is selectable by the user to permit convergence of the optical axes on the object being viewed.

Additionally in accordance with this preferred embodiment of the invention, there are provided means for linking focusing of the binocular apparatus with convergence of the first and second optical axes whereby focusing of the binocular apparatus on an object being viewed produces desired convergence on the first and second optical axes on the object being viewed.

Additionally in accordance with this embodiment of the present invention, each of the optical axes may comprise ocular and objective optical axes which are selectively angled with respect to each other. This feature allows the separation between the objective lenses to be determined without determining the separation between the oculars.

Further in accordance with an embodiment of the present invention a scale may be associated with the binocular apparatus for indicating the distance of a distant object onto which the binoculars are focussed as a function of the convergence angle of the optical axes of the telescopes thereof.

Additionally in accordance with an embodiment of the invention there is provided a stereo microscope of the common main objective type comprising first and second parallel telescopes having identical magnification M; a common main objective lens having a focal length F and a stage defining an object location, and wherein the stage is located in a plane located a distance from the main objective lens less than the focal length F by an amount which is equal to the distance separating the optics defined by the first and second parallel telescopes divided by the product of M and the convergence angle of the light passing through the first and second telescopes originating at a point on the object location.

Further in accordance with an embodiment of the invention there is provided a stereo microscope of the common main objective type comprising first and second parallel telescopes having identical magnification M; a common main objective lens having a focal length F and a stage defining an object location, and wherein the stage is located in the focal plane and the optical axes of the telescopes are tilted with respect to each other by an angle $\beta$, where $\beta$ is equal to $\gamma/(M-1)$ where $\gamma$ is the angle between the two light rays originating from the observed object and passing through the telescopes.

Additionally in accordance with a preferred embodiment of the present invention reticles may be associated with the first and second optical axes to provide a visible indication of proper angular alignment thereof which produces correct depth perception.

BRIEF DESCRIPTION OF THE DRAWINGS

The present invention will be understood and appreciated more fully from the following detailed description taken in conjunction with the drawings in which.

DETAILED DESCRIPTION OF THE INVENTION

Figure 1:
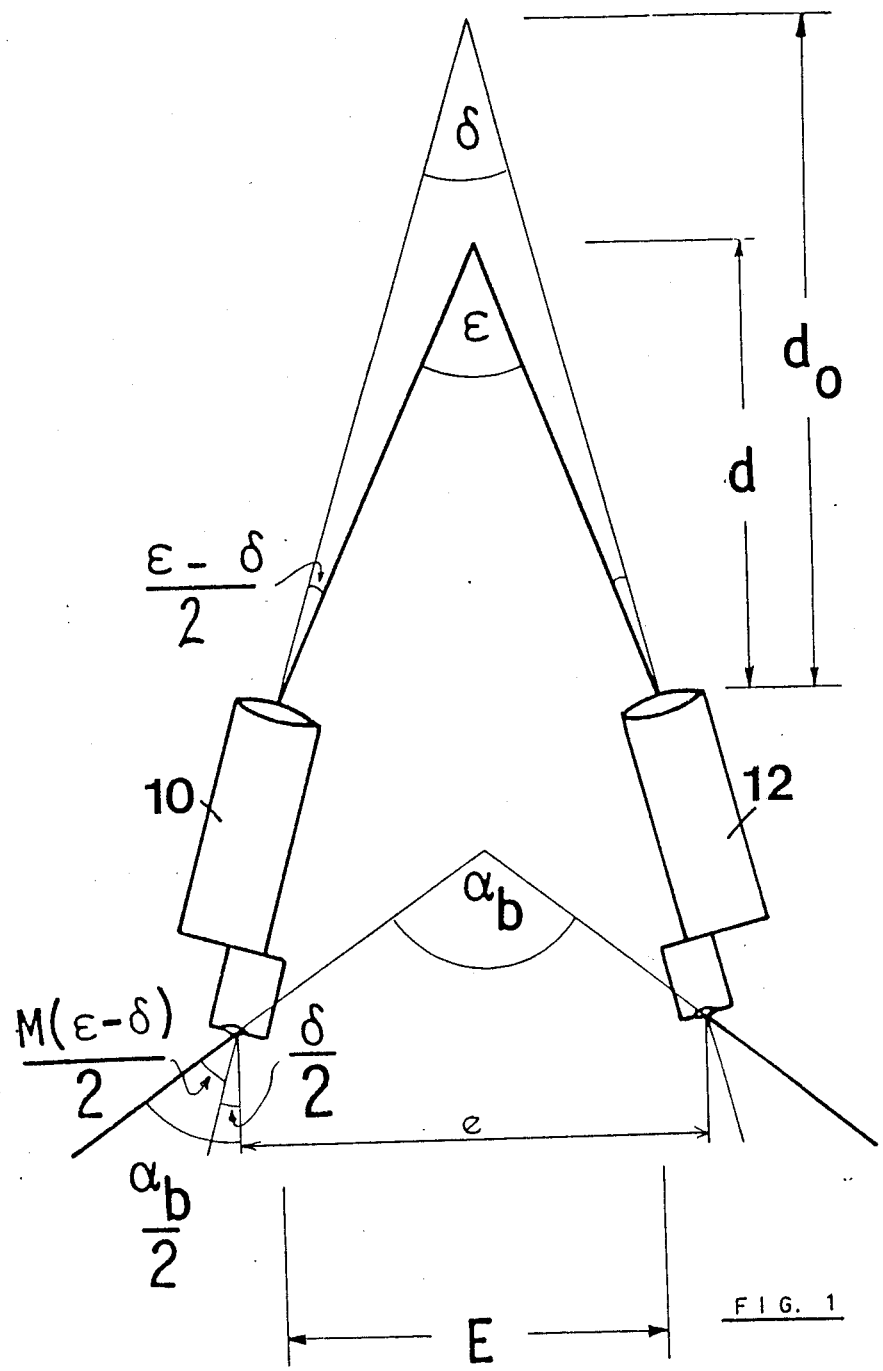
FIG. 1 is an optical diagram illustrating the structure of binoculars constructed and operative in accordance with a preferred embodiment of the present invention.

Reference is now made to FIG. 1 which illustrates the structure of binoculars constructed and operative in accordance with the present invention and which will be used herein to illustrate the underlying principles of the invention.

The basis for the present invention is a novel appreciation by the present inventor based on original research carried out by him, of the functional relationship between magnification and the distortion of the magnitude of the depth relative to the magnitude of the width and height in the perceived image in stereoscopic optical apparatus.

It is known that the human obtains information regarding the depth of a distant object from the differences in the angle $\alpha$ subtended by the front and the back of the object respectively, where:

$$d = e/\alpha \tag{1}$$

where
- d = distance to the object
- e = pubillary distance of the observer
- $\alpha$ = the convergence angle on the object in a given plane The present inventor has appreciated that depth may be expressed as follows:

$$\text{Depth} = \Delta d = -e \frac{\Delta \alpha}{\alpha^2} \tag{2}$$

The depth information is thus dependent not only on the disparity $\Delta\alpha$ but also on the convergence angle $\alpha$.

The human obtains information regarding the width and height of a distant object from the angle $\theta$ subtended by the object and from its distance d from the observer in accordance with the following relationship:

$$\text{Width} = \Delta x = d \cdot \theta = e \frac{\theta}{\alpha} \tag{3}$$

The following expression is thus obtained:

$$\frac{\Delta d}{\Delta x} = \frac{\Delta \alpha}{\alpha \cdot \theta} \tag{4}$$

Binoculars operate to increase the observed angle $\alpha_b$ and the observed angle $\theta_b$ according to the following relationship:

$$\alpha_b = \frac{ME\alpha}{e} \; ; \; \theta_b = M\theta \tag{5}$$

where
- M = magnification of binoculars
- E = distance between objective lenses
- $\alpha$ = convergence angle in unaided vision
- $\alpha_b$ = coonvergence angle of eyes of the observer on the image of the object as viewed through the binoculars
- $\theta_b$ = angle subtended by the image of the object as viewed through the binoculars
- e = pupillary distance From equation (5) it follows that $\Delta\alpha_b = ME\Delta\alpha/e$. Hence, $$\Delta d_b/\Delta x_b = \Delta\alpha_b/\alpha_b \cdot \theta_b = -\{ME \cdot \Delta\alpha/e\}/\{ME(\alpha/e) \cdot M\theta\} \tag{6}$$

$$= \Delta\alpha/M\alpha \cdot \theta = \frac{1 \Delta d/\Delta x}{M}$$

where $\Delta d_b$ and $\Delta x_b$ are the observed depth and the observed width, respectively, of the object as viewed through the binoculars.

The above calculations all apply to binoculars comprising parallel optical axes as in the prior art. The present invention is based on the novel appreciation that if the optical axes of the two telescopes making up the binoculars are angled towards each other to converge on the object being viewed, the distoration introduced by the magnification M is removed.

FIG. 1 provides an optical diagram illustrating the operation of binoculars constructed and operative in accordance with a preferred embodiment of the present invention. For simplicity and clarity the mechanical linkage of the two binocular telescopes 10 and 12 is not shown and the angular orientation therebetween is exaggerated.

In accordance with the present invention the relationship between the depth and the width of an object as seen through the binoculars illustrated in FIG. 1 is given by the following expressions:

$$\alpha_b/2 = M(\epsilon - \delta)/2 + \delta/2 = M\epsilon/2 + (1 - M)\delta/2$$

$$= M(E/d)/2 + (1 - M)(E/d_o)/2.$$

Hence, $$\alpha_b = E[M/d + (1-M)/d_o].$$

Differentiation of this equation yields the following expression:

$$\Delta\alpha_b/\Delta d = -EM/d^2.$$

Remembering that $\theta_b = M\theta = M(\Delta x/d)$, one obtains:

$$\Delta d_b/\Delta x_b = -\Delta\alpha_b/\alpha_b \cdot \theta_b \tag{7}$$

$$= -\{(EM/d^2)\Delta d\}/\{E[M/d + (1 - M)/d_o)] \cdot M(\Delta x/d)\}$$

$$= \Delta d/\{[(1 - M)/d_o] + [M/d]\}d \cdot \Delta x$$

where
- $\beta$ = the angle between the optical axes of the telescopes 10 and 12 (FIG. 1)
- $\epsilon$ = the angle subtended by the objective lenses of the telescopes at a distance d where the viewed object is located
- $d_o$ = the distance from the binoculars to where the optical axes meet.

where the symbols are illustrated in FIG. 1.

It may be appreciated that the distortion of the magnification is removed when $d = d_o$, i.e. when the optical axes of the telescopes 10 and 12 converge on the object being inspected.

Figure 2:
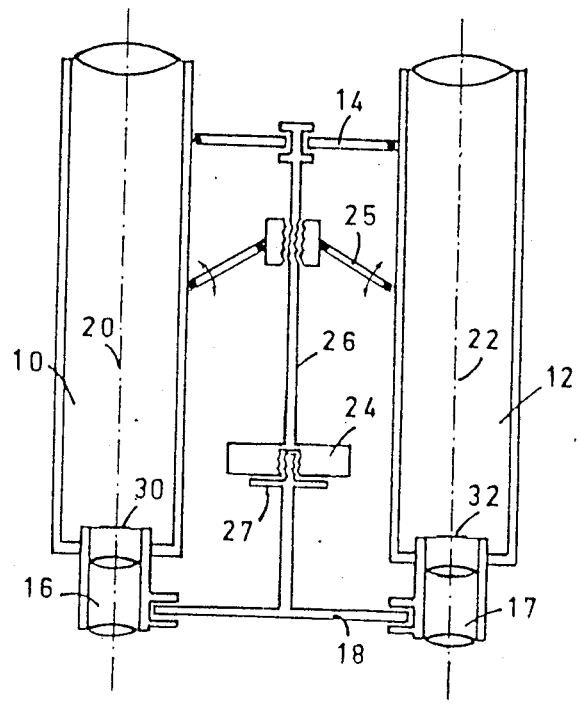
FIG. 2 is an illustration of binoculars constructed and operative in accordance with a preferred embodiment of the present invention.

FIG. 2 illustrates in more pictorial form, the binoculars illustrated in FIG. 1. Here the two telescopes 10 and 12 are seen to be pivotably connected by a fixed separation hinge 14. The oculars 16 and 17 of the binoculars are joined by a common element 18, and are mounted for selectable displacement along the optical axes 20 and 22 of the respective telescopes 10 and 12 so as to provide focussing in a conventional manner. A manually operative dial 24 associated with a threaded rod 26 is provided in a conventional manner for effecting focusing.

In accordance with the preferred embodiment of the invention illustrated in FIG. 2, a screw driven variable separation hinge 25 is provided intermediate hinge 14 and the ocular for selectively pivoting the telescopes into a nonparallel orientation. Hinge 25 is coupled to the threaded rod 26 in such a manner that the angular orientation of the telescope optical axes and their convergance on an object being viewed is matched to the focussing of the oculars on that object. This is made possible by the very nearly linear relationship between the change in convergence angle and axial displacement of the ocular required for focussing.

Further in accordance with a preferred embodiment of the present invention reticles, typically in the form of dots 30 and 32, are associated with the oculars 16 and 17 and are located along their respective optical axes. Coincidence of the dots at the same depth on the viewed object, as seen by a user, indicates correct angular orientation of the binocular telescopes and convergence of their respective optical axes on the object being viewed.

In binoculars the dots should be located on the optical axes. In microscopes, the dots should be located off the optical axis to yield proper eye convergence indicated by angle $\alpha$ in FIG. 3. To obtain undistorted depth perception of the viewed object, the angle $\alpha$ should be equal to the angle $\gamma$ (see FIG. 3) subtended by the light rays emerging from the object and entering the telescopes. The distance D of the dot from the optical axis in the focal plane of the ocular is thus given by $f \cdot \gamma/2$ (where f is the focal length of the eyepiece), in the case where the object is displaced from the focal plane of the common main objective lens.

In the alternative case, where the object is located in the focal plane of the common main objective lens, but the individual telescopes are angled, the distance D is given by the expression $f \cdot [M/(M-1)] \cdot [\gamma/2]$. The reason for this is that the telescopes have to be tilted by an angle $[\gamma/2]/(M-1)$, to which one has to add the half-angle of convergence, i.e. $\gamma/2$. Thus, $$D = f \cdot \{[\gamma/2] + \{[\gamma/2]/(M-1)\}\} = f \cdot [M/(M-1)] \cdot [\gamma/2].$$

In both cases f is the focal length of the ocular lens.

Additionally in accordance with an embodiment of the present invention, a distance indicating scale 27 may be printed on or otherwise associated with dial 24 for providing a visual indication of the distance of the viewed object which is focussed upon.

It is noted that there exist various ways of adjusting the convergence angle of the optical axes of the two telescopes. These include, for example, providing a lateral shift of the ocular lenses or of the objective lenses relative to each other. One may also adjust the convergence angle by adjusting the angles of the reflecting surfaces in the existing prisms in otherwise conventional binoculars, by adjusting the angles of the refracting surfaces in auxiliary prisms provided for this purpose, or by suitably adjusting the surfaces of auxiliary mirrors provided for this purpose.

Figure 3:
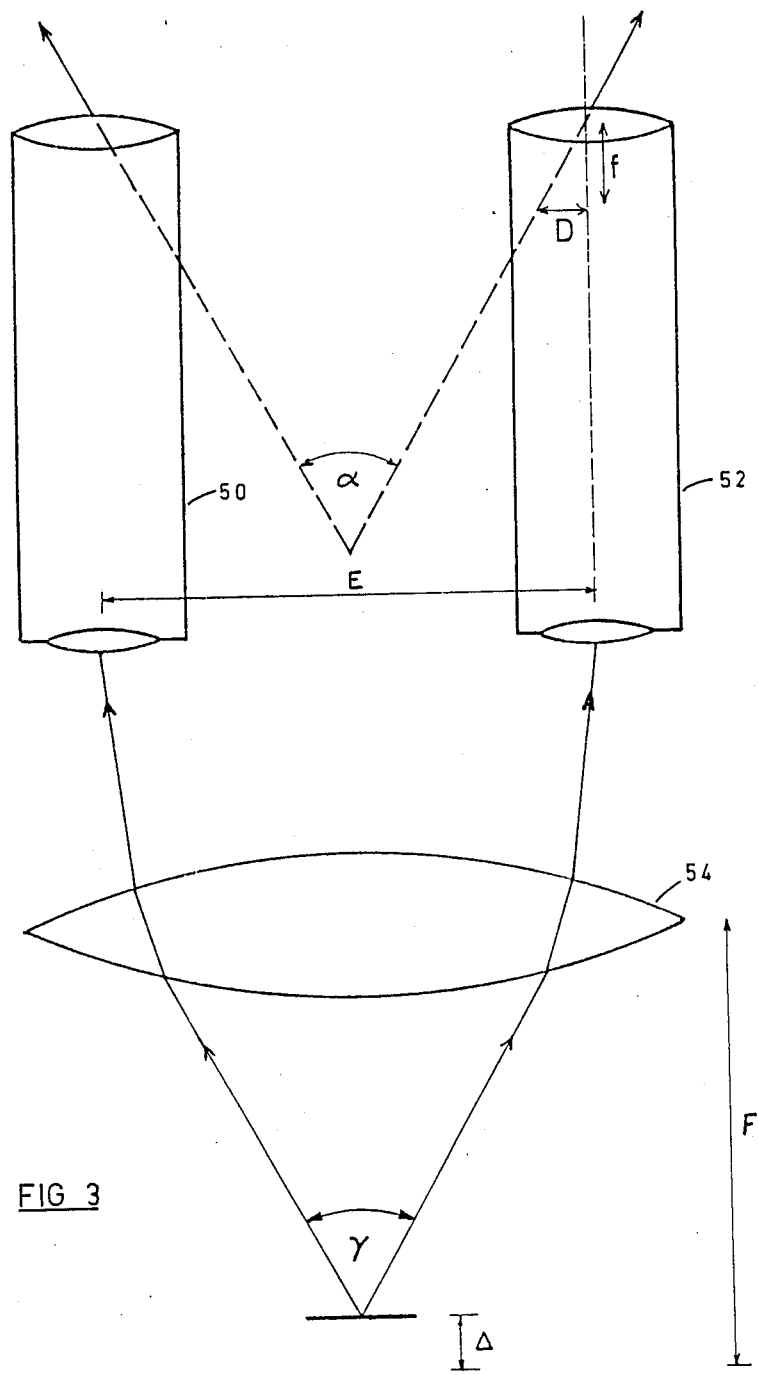
FIG. 3 is an optical diagram illustrating the structure of a common main objective type microscope constructed and operative in accordance with a preferred embodiment of the present invention.

FIG. 3 illustrates a common main objective type of microscope including a pair of parallel telescopes 50 and 52, separated by a distance E and a common main objective lens 54 having a focal length F.

In accordance with the present invention distortion of depth of the observed object is prevented by selecting the location of the observed object to be at a distance $\Delta$ above the focal plane of the common objective lens so that it fulfills the following relationship:

$$\Delta = E/\gamma M \qquad (8)$$

where $\gamma$ is the angle between the two light rays originating from the observed object and passing through the telescopes. This relationship ensures that the angle $\alpha$ is equal to the angle $\gamma$ (see FIG. 3). It may be noted that in the design of the microscope the angle $\gamma$ is obtained by choosing a main objective lens of such focal length F that the following relationship is fulfilled:

$$F \cong E/\gamma \qquad (9)$$

This relationship may be modified, if needed, by a system of prisms, lenses or mirrors placed between the object and objective lens.

It is noted that whereas in the case of binoculars, arrangement of the telescopes along converging optical axes meeting at the object overcomes the depth distortion, this is not the case for microscopes of the common main objective type and even microscopes displaying such convergence produce depth distortion.

It will be appreciated by persons skilled in the art that the present invention is not limited to what has been particularly shown and described hereinabove. Rather the scope of the present invention is defined only by the claims which follow.

I claim:

1. Stereo microscope apparatus of the common main objective type comprising:
   first and second parallel telescopes defining first and second optical axes and having identical magnification M;
   a common main objective lens having a focal length F;
   a stage defining an object location wherein the stage is located in a plane located a distance from the focal plane of the main objective lens which is equal to the distance E separating the optical axes defined by the first and second parallel telescopes divided by the product of M and the angle gamma which is the angle between the two light rays originating from the observed object and passing through the telescopes; and
   reticles associated with the first and second optical axes to provide a visible indication of proper angular alignment of the optical axes of the telescopes or object location which produces correct depth perception, wherein the reticles are in each case located a distance from the optical axis in the focal plane of the ocular given by the expression $0.5 \times f \times gamma$ where f is the focal length of the ocular lens.

2. Stereoscopic binocular apparatus according to claim 1 and also comprising ocular means; means for selectably positioning said ocular means along said first and second optical axes for providing focusing of said binocular apparatus; and means for linking operation of said selectably positioning means with convergence of said first and second optical axes whereby focusing of the binocular apparatus on an object being viewed produces desired convergence of the first and second optical axes on the object being viewed.

3. Stereo microscope apparatus of the common main objective type comprising:
   first and second parallel telescopes defining first and second optical axes and having identical magnification M;
   a common main objective lens having a focal length F;
   a stage defining an object location wherein the stage is located at the focal plane of the main objective lens and the individual telescopes are tilted with respect to the parallel configuration by an angle which equals $(\gamma/2)/(M-1)$ where $\gamma$ is the angle between the two light rays originating from the object and passing through the telescopes; and reticles associated with the first and second optical axes to provide a visible indication of proper angular alignment of the optical axes of the telescopes or object location which produces correct depth perception, wherein the recticles are in each case located a distance from the optical axis in the focal plane of the ocular given by the expression $$0.5 \times f \times \{M/(M-1)\} \times \text{gamma}$$

where f is the focal length of the ocular lens.

4. Stereoscopic binocular apparatus according to claim 3 and also comprising ocular means; means for selectably positioning said ocular means along said first and second optical axes for providing focusing of said binocular apparatus; and means for linking operation of said selectably positioning means with convergence of said first and second optical axes whereby focusing of the binocular apparatus on an object being viewed produces desired convergence of the first and second optical axes on the object being viewed.

* * * * *